June 18, 1929.　　　　W. E. SYKES　　　　1,717,816
FLEXIBLE SHAFT COUPLING
Filed June 7, 1926　　　3 Sheets-Sheet 1

Inventor
William E. Sykes
By Henry E. Rockwell
Attorney

June 18, 1929. W. E. SYKES 1,717,816
FLEXIBLE SHAFT COUPLING
Filed June 7, 1926 3 Sheets-Sheet 2

Inventor
William E. Sykes
By Henry E. Prickwell
Attorney

June 18, 1929.  W. E. SYKES  1,717,816
FLEXIBLE SHAFT COUPLING
Filed June 7, 1926   3 Sheets-Sheet 3
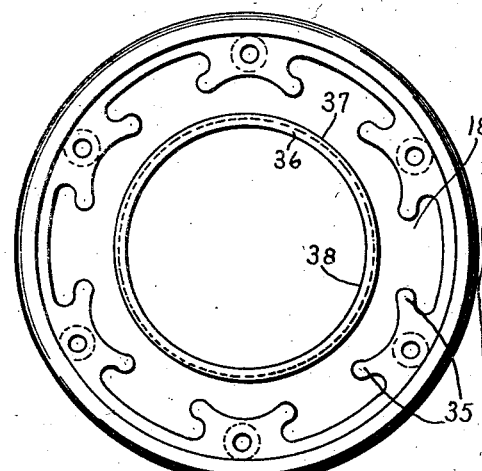
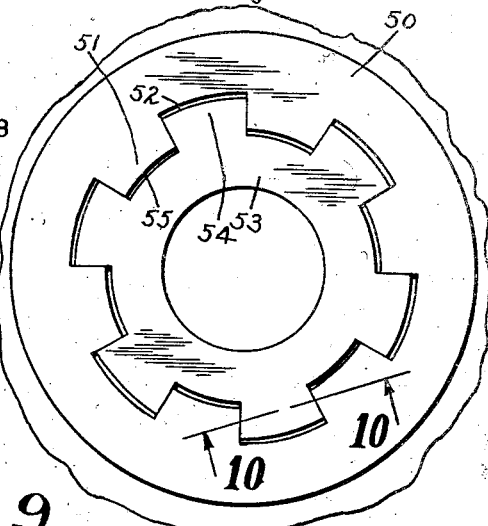
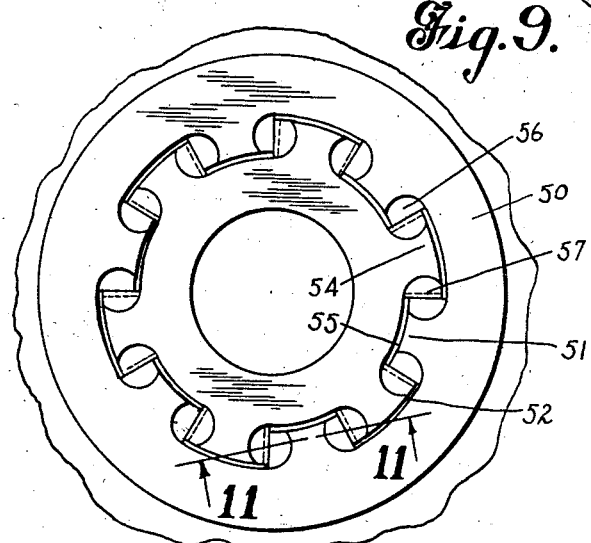
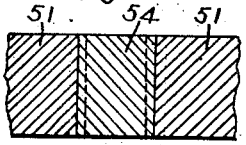
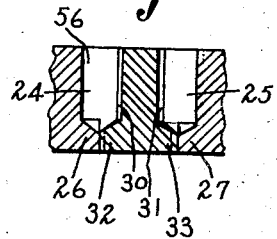
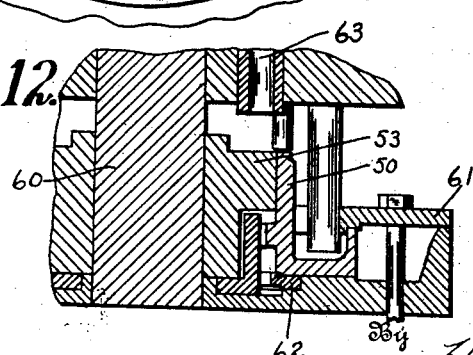
Inventor
William E. Sykes
By Henry E. Rockwell
Attorney Patented June 18, 1929.

1,717,816

UNITED STATES PATENT OFFICE.

WILLIAM E. SYKES, OF BUFFALO, NEW YORK.

FLEXIBLE SHAFT COUPLING.

Application filed June 7, 1926. Serial No. 114,174.

This invention relates to flexible or universal couplings for connecting the ends of abutting shafts or the like together. More especially this invention contemplates improvements in couplings designed for such use wherein rotatable members are interposed between the operating parts thereof to allow freedom of movement between the connected shafts, during the rotation thereof, in angular, axial and lateral directions, so as to prevent vibration and undue friction at the shaft bearings due to possible misalignment of the connected shafts. The coupling to be hereinafter described is somewhat similar to the coupling described and claimed in an application of William E. Sykes, Serial No. 753,458 filed December 2, 1924, and may in certain aspects be considered an improvement thereover or a modification thereof.

One of the objects of this invention is to provide a coupling of novel structure which will be inexpensive to manufacture, efficient in use and readily installed.

Another object of this invention is to provide a coupling wherein there is provision to eliminate the possibility of interruption of the rotatable movement between two connected shafts, due to breakage of parts in the coupling structure.

Still another object of this invention is to provide a coupling of such structure that the same may be accurately produced and will have a minimum number of parts.

To these and other ends the invention consists in the novel features and combination of parts and method of making the same to be hereinafter described and claimed.

In the accompanying drawings:

Fig. 7 is an inner face view of the end plate of the coupling;

Fig. 8 is an end view of certain parts of the coupling partially formed and assembled together for the purpose of having further operations, in the course of the manufacture thereof, performed;

Fig. 9 is a view of the parts shown in Fig. 8, after certain manufacturing operations have been performed, and indicating in dotted lines still further operations;

Fig. 10 is a section on line 10—10 of Fig. 8;

Fig. 11 is a section on line 11—11 of Fig. 9, and

Fig. 12 is a sectional view through one of the tools used during one of the manufacturing operations.

Figure 1:
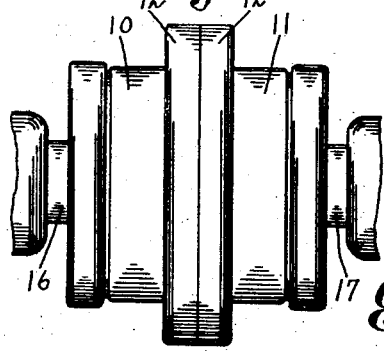
Fig. 1 is an elevation of a coupling embodying the features of this invention.
Figure 2:
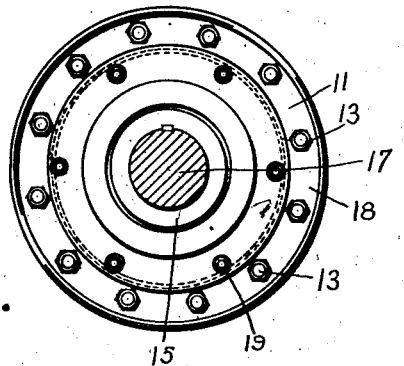
Fig. 2 is an end view of the same.
Figure 3:
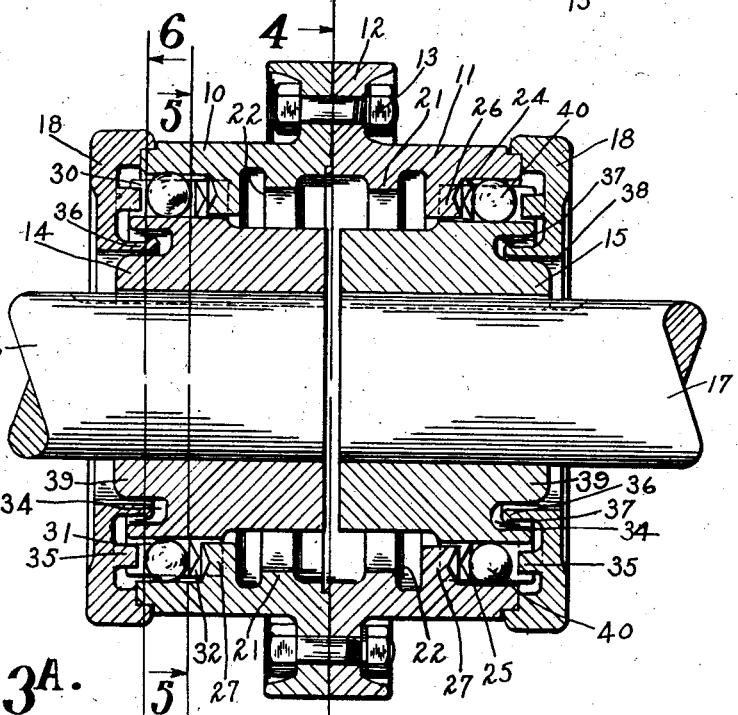
Fig. 3 is a section on line 3—3 of Fig. 4.
Figure 3A:
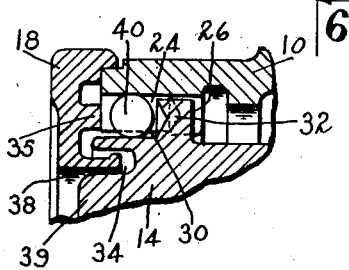
Fig. 3A is a partial section on line 3A—3A of Fig. 4.
Figure 4:
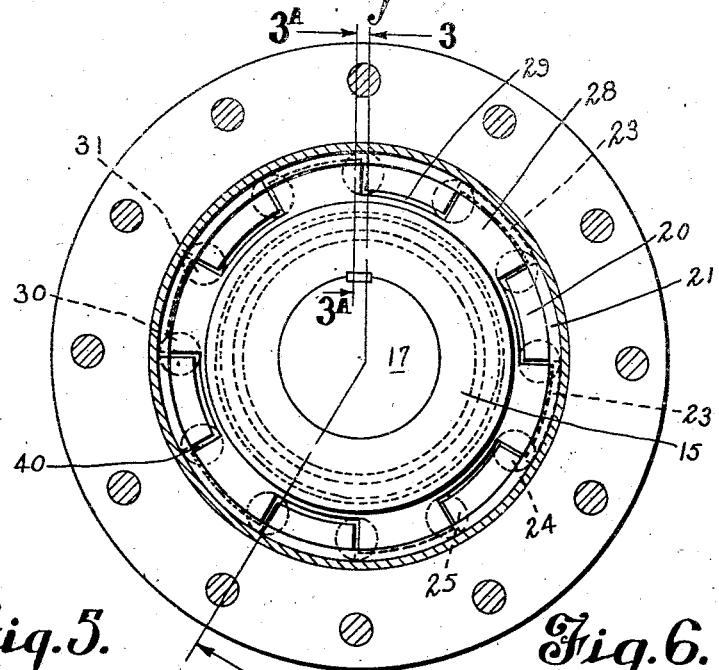
Fig. 4 is a section on line 4—4 of Fig. 3.
Figure 5:
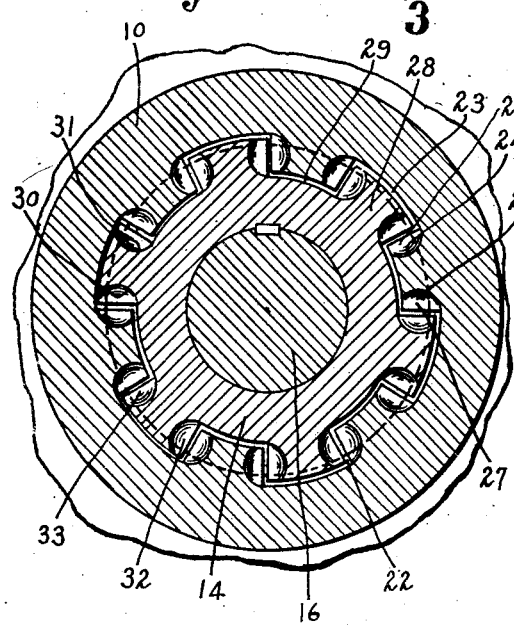
Fig. 5 is a section on line 5—5 of Fig. 3.
Figure 6:
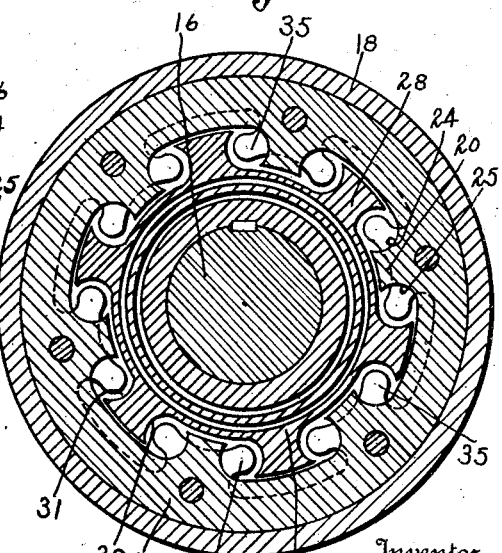
Fig. 6 is a section on line 6—6 of Fig. 3.

The coupling shown in the drawings comprises an outer casing composed of two flanged sections 10 and 11, bolted together above the abutting flanges 12 by the bolts 13, the inner members or shaft hubs 14 and 15 which are keyed or otherwise secured to shaft ends 16 and 17 respectively, and end caps or cover plates 18 which are secured to the outer casing by means of the screws 19.

The outer casing is, in this instance, in the form of a hollow cylinder having upon its inner wall a series of radially and inwardly projecting lugs 20 which are equally spaced about the periphery thereof. The lugs 20 extend axially of the casing from each end of the casing toward each other. Axially spaced from the inner end of each series of lugs is a radially and inwardly projecting ring 21 for a purpose to be hereinafter described. The ring 21, in this instance, is illustrated as being in two portions but obviously the same could be formed integral as one piece in order to provide an axially and outwardly facing shoulder 22 of a lesser diameter than the inner diameter of the casing at the spaces 23 between the lugs 20.

The lugs 20 are each provided with axially directed grooves 24 and 25, one groove being in each of the side faces thereof. Preferably the grooves 24 and 25 are substantially semicircular in cross-section and extend axially inwardly from the outer ends of the lugs a greater part of the length thereof. The remainder of the material in alignment with the grooves 24 and 25 is retained integral with the lugs to form stops or abutments 26 and 27 closing the inner ends of the grooves.

The inner members or shaft hubs 14 and 15 are provided with outwardly extending lugs 28 equally spaced about the periphery thereof, forming spaces 29 therebetween, the lugs 28 extending axially of each member from the outer end thereof. The hub member axially and inwardly beyond the lugs 28 is reduced in diameter sufficiently to avoid possible interference with other parts of the coupling. Each of the lugs 28 is provided with axially directed grooves 30 and 31, one groove being in each of the side faces thereof. Preferably these grooves are semi-circular in cross-section and extend axially inwardly from the outer ends of the lugs the greater part of the length thereof. The remainder of the material of the lugs 28 in alignment with the grooves 30 and 31 is retained integral with the lugs to form stops or abutments 32 and 33 closing the inner ends of the grooves. The outer face of each inner member is provided with the annular groove 34 forming part of an oil trap.

The end caps or cover plates 18 are provided with a series of lugs 35 integrally formed upon the inner face thereof and extending axially inwardly with respect to said coupling. The lugs 35 are disposed about the inner face of each plate 18 so as to be concentric with the grooves in the lugs of both the outer casing and the inner member adjacent thereto. The lugs 35, therefore, will act as stops or abutments to close the outer ends of the respective grooves 24 and 25 and 30 and 31. The plates 18 may also be provided with an annular ring 36 which extends axially and inwardly into the annular groove 34 of the adjacent inner member and has an annular rib 37 extending peripherally about its inner end of increased diameter. An opening 38 is provided on each end plate 18, which surrounds the outer end portion 39 of the inner members but is not in contact therewith thereby allowing a certain amount of play therebetween.

The above described parts are assembled together in such a manner that the lugs 20 of the outer casing are interlocked between the lugs 28 of the inner member in the spaces 29 therebetween, while the lugs 28 of the inner member are disposed in the spaces formed by the lugs 20 of the outer casing. This arrangement causes the respective grooves in the side faces of the lugs of each member to coincide to form a substantially circular opening therebetween, and also causes the respective abutments 32 and 33 of the inner member and 26 and 27 of the outer casing to coincide. Into each of the circular openings so formed, a rotatable member 40 is placed which, in this instance, is spherical in form. The rotatable members 40, while being free to rotate in any direction, are confined within the circular openings between the respective lugs at one end thereof by means of the abutments or stops 26 and 27 and 32 and 33. The rotatable members 40 by substantially filling up each of the openings peripherally with respect to the casing, complete the interlocking of the casing with the inner members and provide the means for driving one from the other without allowance of play therebetween, it being understood that the lugs 28 of the inner member are smaller in width peripherally than the width of the spaces between the lugs 20 of the outer casing.

The outer cap 18 is secured to the outer casing by the screws 19 in such a manner that the lugs 35 are disposed concentric to the opening formed by the coinciding grooves in the lugs of the inner member and outer casing, and therefore act as outer stops or abutments to retain the rotatable members 40 within these openings.

The annular ring 21 of the outer casing being smaller in diameter than the internal diameter of the spaces between the lugs 20 is also smaller in diameter than the external diameter of the lugs 28 upon the inner member so that each inner member is prevented from sliding through the casing sufficiently to allow the rotatable members 40 to become disengaged from the openings and to drop in between the outer cap 18 and the inner member.

In case one or more of the rotatable members 40 should break while the coupling is under driving load, no serious damage would result due to the fact that the coinciding stops or abutments 26 and 27 and 32 and 33, respectively, would become engaged and continue the connection between the rotating shafts. This advantageous feature prevents a possible shut-down of an entire manufacturing plant or portion thereof, especially where the coupling is used in connection with a main drive, thereby preventing considerable loss in production and possible damage to machinery and equipment.

In operation, assuming that the shaft end 16 is the driver, the connected hub or inner member 14, the lugs 28, the rotatable members 40 and the lugs 20 of the outer casing, drives the outer casing which in turn through lugs 20, rotatable members 40, lugs 28 and the inner member 15 connected to the shaft end 17 drives the shaft 17. As described in the copending application above identified, the shafts 16 and 17 may be offset from each other either laterally, vertically or angularly, with no disadvantage being present due to binding of the coupling parts, undue friction upon the shaft bearings nor vibration because of the misalignment therebetween. The coupling illustrated will take care of every kind of misalignment whether it be angular, offset, or combined angular and offset, it being understood that the misalignment is, of course, within limits which are approximately five degrees for angularity, and 4% of the maximum shaft diameter for the offset. That is to say, the offset limit for a coupling used with a 4" diameter shaft will allow an offset between the coupled shafts of .16 inch.

When a lubricant is used within the coupling casing, the same is retained therein by the cooperative action of the interlocked parts 36 and 37 of the outer plate, and the annular groove 34 of the inner members, although in some instances these parts may be omitted. The above described coupling, however, may work satisfactorily without internal lubrication due to the perfect co-ordination of its parts.

In order to obtain the efficient co-ordination of the parts of the above described coupling, a novel method of manufacturing has been developed, the operations of which will now be described with reference to Figs. 8 to 12, inclusive.

An outer casing blank 50 is provided by casting or forging the same from a suitable metal with the lugs 51 spaced apart by spaces 52 about the interior thereof. A blank 53 of an inner member is also provided with the lugs 54 thereof spaced apart by the spaces 55 about the outer periphery thereof.

The lugs 54 of the inner member blank 53 are arranged to fit tightly in the spaces 52 of the casing blank, as shown in Figs. 8 and 10. The members are then placed in a jig similar to that partially shown in Fig. 12, wherein the inner member blank 53 is properly located by means of the centering post 60 and the outer casing securely clamped and located by the clamp 61 and the locating ring 62. By means of a properly located drill bushing 63 a hole 56 is drilled and accurately reamed between and partially in each of the lugs 51 and 54 of the casing blank 50 and the inner member blank 53, respectively, as shown in Figs. 9 and 11. The diameter of the opening after reaming is substantially equal to the diameter of the rotatable members to be used. The parts are then removed from the jig and a portion of the material is, in this instance, removed from each of the sides of the lugs 54 of the inner member blank 53, as indicated at 57 by dotted lines in Fig. 9, so that sufficient clearance will be provided between these lugs and the lugs 51 of the outer casing blank 50. Being drilled and reamed together, the two blanks when completed will of necessity cooperate with each other to operate efficiently.

In some instance it has been found advantageous to harden the metal surrounding the grooves 24, 25, 30 and 31, in order to obviate wear upon the surfaces thereof. This operation is performed before the assembly of the parts, as above described, preferably after the blanks are drilled, reamed and have had the metal removed from the sides of the lugs for clearance.

While I have shown and described a preferred embodiment of my invention and the preferred steps in the method of making the same, it will be understood that it is not to be limited to all of the details shown, nor to the order of the operations thereof, as these are capable of modification and variation which will lie within the spirit of the invention and the scope of the appended claims.

What I claim is:

1. In a coupling for shafts or the like, a hollow casing and a hub member enclosed thereby, said casing having spaced apart depending lugs upon its internal periphery extending axially and inwardly from an end thereof, an annular rib spaced from the inner termination of said lugs, said hub member having spaced apart outwardly extending lugs upon its periphery, extending axially from one end thereof and being adapted to enter these spaces between the casing lugs whereby the side surfaces thereof will be in opposed relation with the side surfaces of said casing lugs, the exterior diameter of said hub member across the lugs thereon being of larger dimension than the interior diameter of said annular rib whereby said rib will prevent the hub member lugs against total axial displacement from the spaces between the casing lugs, said lugs of said casing and said hub member being provided with grooves in the opposed side surfaces thereof, and rotatable members interposed between the opposed side surfaces of said casing, and hub member lugs within the opening formed by the coinciding grooves therein.

2. In a coupling for shafts or the like, a hollow casing and a hub member enclosed thereby, said casing having spaced apart depending lugs upon its internal periphery extending axially and inwardly from an end thereof, said hub member having spaced apart outwardly extending lugs upon its periphery extending axially from one end thereof, said hub member lugs being substantially of the same length axially as said casing lugs and being adapted to enter the spaces between the casing lugs whereby the side surfaces thereof will be in opposed relation with the side surfaces of said casing lugs, said lugs of said casing and said hub member being provided with grooves in the opposed side surfaces thereof, the grooves in one being equal in length to the grooves in the other and in coinciding relation therewith, the grooves terminating short of the internal end of each lug of both members whereby a groove closure is formed by the remaining portion of each lug, and rotatable members within the opening formed by the coinciding grooves, said groove closures preventing said rotatable members against axial displacement from said opening in one direction.

3. In a coupling for shafts or the like, a hollow casing and a hub member enclosed thereby, said casing having spaced apart depending lugs upon its internal periphery extending axially and inwardly from each end thereof, an annular rib spaced from and intermediate the inner termination of each series of said lugs, said hub member having spaced apart outwardly extending lugs upon its periphery extending axially from one end thereof and being adapted to enter the spaces between the casing lugs whereby the side surfaces thereof will be in opposed relation with the side surfaces of said casing lugs, the exterior diameter of said hub member across the lugs thereon being of greater dimension than the interior diameter of said annular rib whereby said rib will prevent the lugs thereof against total axial displacement from between the spaces in said casing, said lugs of said casing in said hub member being provided with grooves in the opposed side surfaces thereof, the grooves in one coinciding with the grooves in the other and terminating short of the internal end of each lug of both members, rotatable members within the opening formed by the coinciding grooves, an end plate secured to the end of said casing and extending over the end of said hub member and lugs upon the inner face of said end plate concentric with the opening formed by the coinciding grooves in the lugs of said casing and hub member to prevent the axial displacement of said rotatable members from said opening in one direction.

4. In a coupling for shafts or the like, a hollow casing and a hub member enclosed thereby, said casing having spaced apart depending lugs upon its internal periphery, said hub member having spaced apart outwardly extending lugs upon its periphery, said hub member lugs being substantially of the same length axially as said casing lugs and being adapted to enter the spaces between said casing lugs whereby the side surfaces thereof will be in opposed relation with the side surfaces of said casing lugs, said lugs of said casing and said hub member being provided with grooves in opposed side surfaces thereof, the grooves in one being equal in length to the grooves in the other, in coinciding relation therewith and terminating short of the internal end of each lug of both members whereby grooved closures are formed thereat, rotatable members within the opening formed by the coinciding grooves, and an end plate secured to the end of said casing having lugs upon the inner face thereof concentric with the opening formed by the coinciding grooves.

5. In a coupling for shafts or the like, a casing and a hub member enclosed thereby, said casing having spaced apart depending lugs upon its interior periphery, said lugs having grooves in the side faces thereof extending axially inwardly from the outer end of said casing the greater part of the length thereof, the remainder of said lugs forming closure members for said grooves, said hub member having spaced apart outwardly extending lugs upon its periphery, the lugs upon said hub member being adapted to enter the spaces between the lugs on said casing and having grooves in the side faces thereof extending axially inwardly from the outer end of said hub member lugs the greater part of the length thereof, the remainder of said lugs forming closure members for said grooves, a rotatable member between the opposing sides of each of said lugs within the grooves therein, said lugs of said hub member and said casing being substantially equal in length whereby the groove closure members on said hub member are in opposed relation to the groove closure members on said casing.

In witness whereof, I have hereunto set my hand this 25th day of May, 1926.

WILLIAM E. SYKES.